United States Patent
Jiang et al.

(10) Patent No.: US 8,933,605 B2
(45) Date of Patent: Jan. 13, 2015

(54) BRUSHLESS MOTOR

(75) Inventors: Mao Xiong Jiang, Shenzhen (CN); Yue Li, Hong Kong (CN); Tao Zhang, Shenzhen (CN); San Ruan Xiao, Shenzhen (CN); Lik Hon Chan, Hong Kong (CN)

(73) Assignee: Johnson Electric S.A., Murten (CH)

( * ) Notice: Subject to any disclaimer, the term of this patent is extended or adjusted under 35 U.S.C. 154(b) by 396 days.

(21) Appl. No.: 13/213,858

(22) Filed: Aug. 19, 2011

(65) Prior Publication Data

US 2012/0042974 A1 Feb. 23, 2012

(30) Foreign Application Priority Data

Aug. 20, 2010 (CN) .................. 2010 2 0502993 U
Oct. 21, 2010 (CN) .................. 2010 2 0573398 U

(51) Int. Cl.
*H02K 1/27* (2006.01)
(52) U.S. Cl.
CPC ............ *H02K 1/278* (2013.01); *H02K 2201/06* (2013.01)
USPC ..................................... 310/156.47
(58) Field of Classification Search
None
See application file for complete search history.

(56) References Cited

U.S. PATENT DOCUMENTS

| | | | | |
|---|---|---|---|---|
| 4,954,736 A * | 9/1990 | Kawamoto et al. | ...... | 310/156.21 |
| 5,220,228 A * | 6/1993 | Sibata | ..................... | 310/216.093 |
| 5,250,867 A * | 10/1993 | Gizaw | ........................... | 310/179 |
| 5,397,951 A * | 3/1995 | Uchida et al. | ............ | 310/156.21 |
| 5,942,873 A * | 8/1999 | Nakano | .......................... | 318/702 |
| 6,552,459 B2 * | 4/2003 | Burton | ..................... | 310/156.08 |
| 6,707,206 B2 * | 3/2004 | Chang | ...................... | 310/156.08 |
| 6,803,690 B2 * | 10/2004 | Bosch | ....................... | 310/156.02 |
| 7,034,424 B2 * | 4/2006 | Kometani et al. | ........ | 310/156.47 |
| 7,071,592 B1 * | 7/2006 | Lu | ............................. | 310/156.25 |
| 7,394,174 B2 * | 7/2008 | Blase et al. | ...................... | 310/43 |
| 7,667,364 B2 * | 2/2010 | Niguchi et al. | .......... | 310/156.55 |
| 2009/0033174 A1 * | 2/2009 | Niguchi et al. | .............. | 310/258 |
| 2009/0060711 A1 | 3/2009 | Gammack et al. | | |

* cited by examiner

*Primary Examiner* — Tran Nguyen
(74) *Attorney, Agent, or Firm* — Muncy, Geissler, Olds & Lowe, P.C.

(57) ABSTRACT

A brushless motor has a stator and a rotor rotatably installed inside of the stator. The stator includes a stator core with teeth protruding inwardly and windings wound on the teeth. The rotor includes a shaft, a rotor core fixed on the shaft, and a ring magnet fixed to the circumferential outer surface of the rotor core. The magnet includes a plurality of magnetic poles radially magnetized so that north poles and south poles are arranged alternately in the circumferential direction. Boundary lines between magnetic poles are skewed by an angle relative to an axis of the shaft.

15 Claims, 4 Drawing Sheets

BRUSHLESS MOTOR

CROSS REFERENCE TO RELATED APPLICATIONS

This non-provisional patent application claims priority under 35 U.S.C. §119(a) from Patent Application No. 201020502993.X filed in The People's Republic of China on Aug. 20, 2010 and Patent Application No. 201020573398.5 filed in The People's Republic of China on Oct. 21, 2010.

FIELD OF THE INVENTION

This invention relates to electric motors, and in particular to a brushless electric motor.

BACKGROUND OF THE INVENTION

A brushless motor comprises a stator and a rotor rotatably mounted to the stator. The stator comprises a stator core comprising inwardly extending teeth and windings wound about the teeth. The rotor comprises a shaft rotatably supported by the stator, a rotor core fixed to the shaft and magnets fixed to the rotor core.

Traditional brushless motors used in industry have a wide opening to the slot between the teeth of the stator and a small air-gap between the rotor and the stator, which results in a large cogging torque and therefore great vibration and noise. This is especially noticeable when the motor is used in a high speed application such as a bladeless fan.

Therefore, there is a desire to develop an improved brushless motor with reduced cogging torque to thereby reduce vibration and noise of the motor.

SUMMARY OF THE INVENTION

Accordingly, in one aspect thereof, the present invention provides a brushless motor comprising: a stator comprising a stator core with teeth protruding inwardly and windings wound on the teeth, and a rotor comprising a shaft, a rotor core fixed to the shaft, and a ring magnet fixed to the circumferential outer surface of the rotor core, the magnet comprising a plurality of magnetic poles radially magnetized so that north poles and south poles are arranged alternately in the circumferential direction, wherein boundary lines between magnetic poles are skewed by an angle a relative to an axis (Z) of the shaft, and a plurality of grooves formed in the circumferential outer surface of the rotor core, each groove extending axially from one end of the rotor core to the other end of the rotor core.

Preferably, the angle α is in the range of 15~30 degrees.

Preferably, a skew angle Θ of the boundary lines between magnetic poles measured at an end plane extending through one end of the magnet, is in the range of Θr to 2Θr, wherein Θr, in electrical degrees, is defined as, Θr=180×(number of magnetic poles in the rotor)/(smallest integer of which both the number of magnetic poles in the rotor and number of magnetic poles in the stator are factors).

Preferably, the number of magnetic poles is 4 and the number of teeth is 6.

Preferably, the boundary lines between adjacent magnetic poles do not radially overlap the grooves.

Preferably, the number of the grooves is equal to the number of magnetic poles of the rotor, and wherein in a radial plane midway between the axial ends of the rotor core, each groove and a centerline of the corresponding magnetic pole radially overlap.

Preferably, the number of the grooves is equal to the number of magnetic poles of the rotor, and a start charging point of each magnetic pole is offset, by an angle β, from a corresponding end of a corresponding groove.

Preferably, at an end plane extending through an end of the rotor core and a corresponding end of the magnet, an angle β, formed between a line extending through the center of the rotor and the start charging point of each magnetic pole and a line extending through the middle of the corresponding groove and the center of the rotor, is in the range of 10~30 mechanical degrees.

According to a second aspect, the present invention also provides a bladeless fan comprising a brushless motor as defined above.

Preferably, the fan comprises a base with an inner chamber and a ring nozzle mounted on the base, the nozzle comprises an inner passage communicating with the chamber of the base, a ring outlet communicating with the inner passage and a Coanda surface formed at the ring outlet, and wherein the motor is disposed within the chamber, and an impeller mounted to the shaft of the motor is arranged to move air from outside of the base into the chamber, through the inner passage, out the ring outlet and over the Coanda surface.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
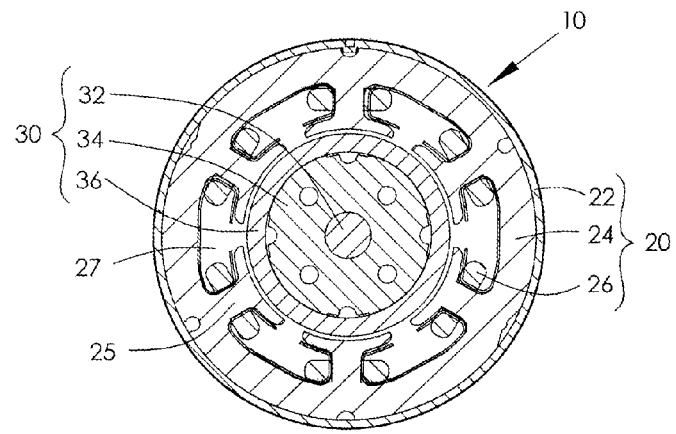
FIG. 1 shows a cross sectional view of a brushless motor according to a preferred embodiment of the present invention.

FIG. 1 illustrates a brushless motor according to a preferred embodiment of the present invention. The motor 10 comprises a stator 20 and a rotor 30 rotatably installed inside the stator 20. The stator 20 comprises a housing 22, a stator core 24 installed at the inner surface of the housing 22, and a plurality of coils 26 wound on the stator core 24. The stator core 24 comprises a plurality of spaced teeth 25 extending inwardly there from. Slots 27 are formed between adjacent teeth 25 for receiving the coils 26. A cylindrical space is formed between the inner ends of the teeth 25.

The rotor 30 comprises a shaft 32 rotatably supported by the stator 20, a rotor core 34 fixed on the shaft 32, a ring magnet 36 fixed on the outer circumferential surface of the rotor core 34, and a pair of balancing members 38 fixed at opposite ends of the rotor core 34. The rotor core 34 and magnet 36 are received in the cylindrical space formed by the teeth of the stator 20 and the magnet 36 faces the inner ends of the teeth 25 with an air gap formed there between to allow the rotor 30 to rotate relative to the stator 20.

Figure 2:
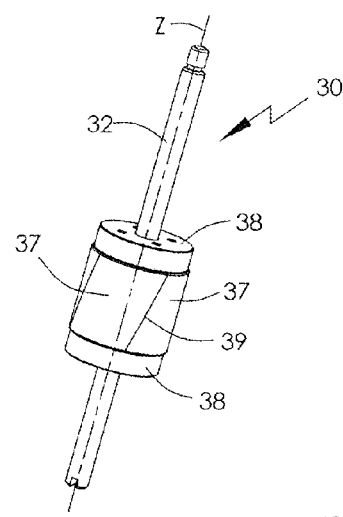
FIG. 2 illustrates a rotor of the brushless motor of FIG. 1.
Figure 3:
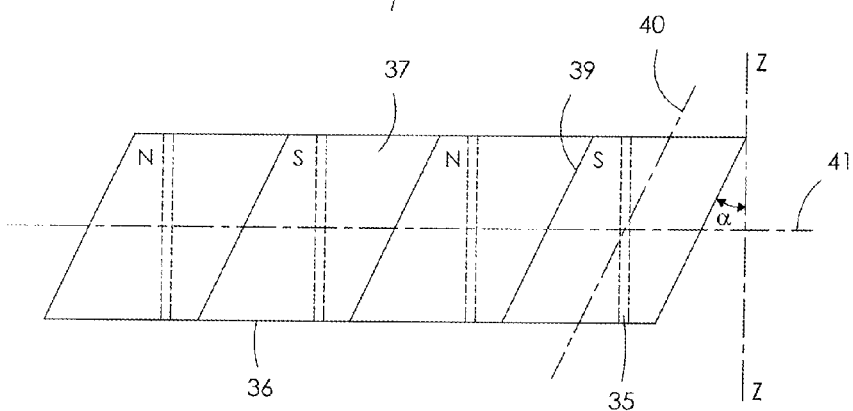
FIG. 3 is an expanded plan view of the magnet of the rotor of FIG. 2.
Figure 6:
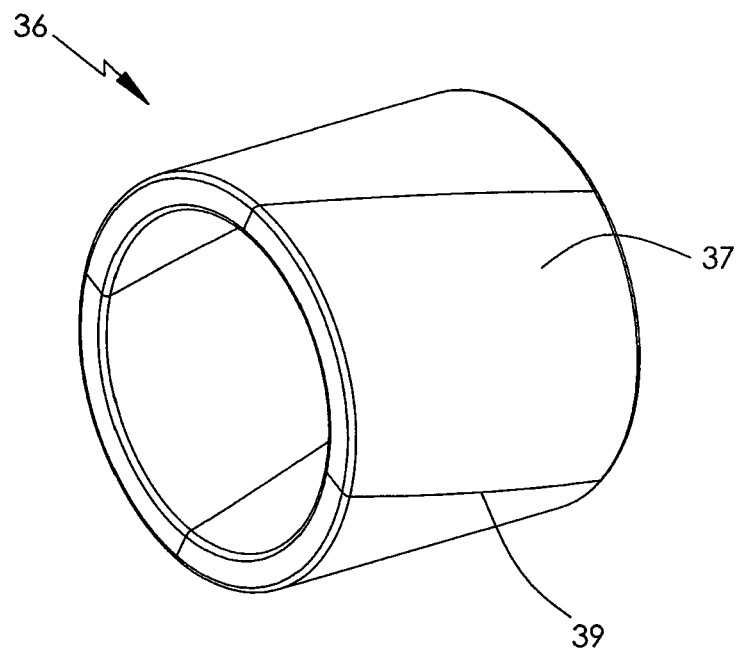
FIG. 6 illustrates the magnet of FIG. 4.

FIG. 2 illustrates a rotor of the brushless motor of FIG. 1. FIG. 6 is a isometric view of the ring magnet 36 and FIG. 3 is an expanded plan view of the ring magnet 36. The magnet 36 comprises a plurality of magnetic poles 37 radially magnetized so that N poles and S poles are arranged alternately about the circumference of the rotor. Boundary lines 39 between the magnetic poles 37 are slanted at an angle α relative to the axis Z-Z of the shaft 32. Preferably, the number of slots 27 of the stator 20 is 6, the number of magnetic poles 37 of the rotor is 4 and the angle α is in the range of 15~30 degrees.

Figure 4:
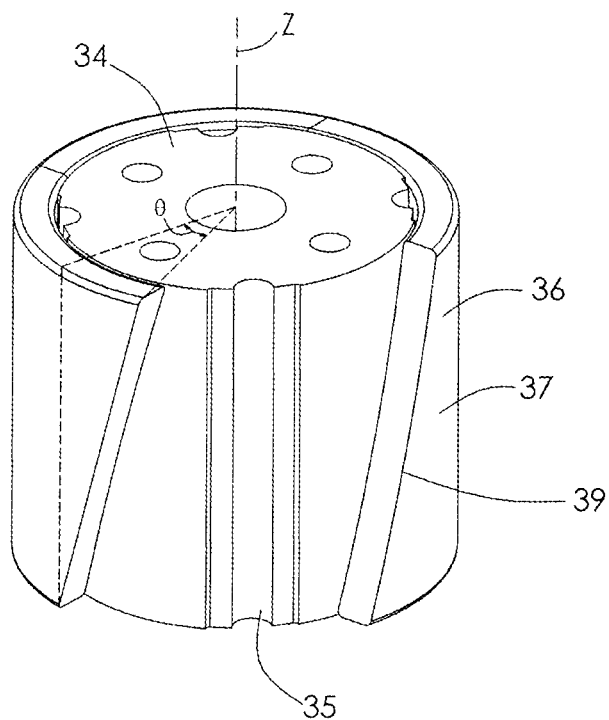
FIG. 4 illustrates a rotor core and magnet of the rotor of FIG. 2.
Figure 5:
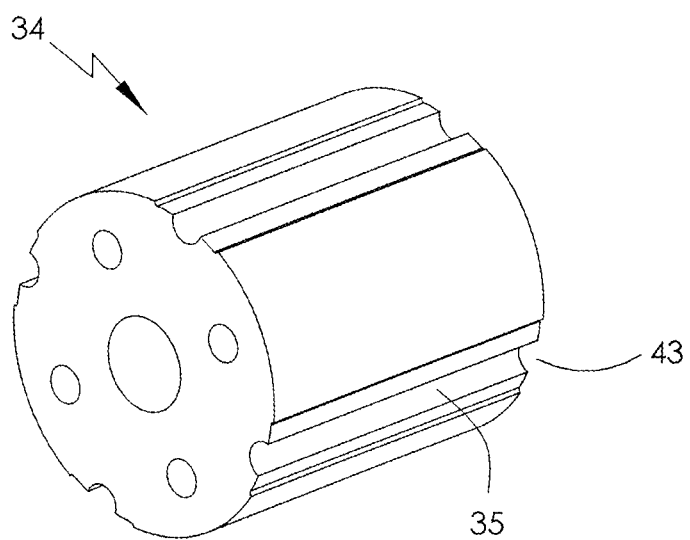
FIG. 5 illustrates the rotor core of FIG. 4.
Figure 7:
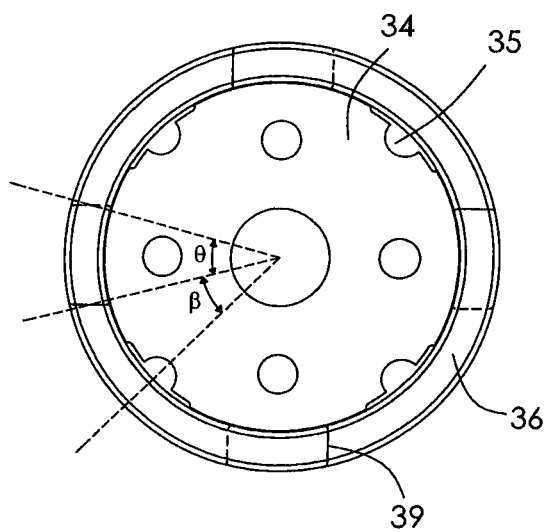
FIG. 7 is an enlarged plan view of the magnet and rotor core of FIG. 4.

FIG. 4 shows the rotor core 34 and the ring magnet 36, with a portion of the ring magnet corresponding to one magnetic pole 37 cutaway or removed to show the underlying rotor core. FIGS. 4 & 7 illustrate an angle ⊖, known as the skew angle. The skew angle is the angle formed at an end plane of the magnet 36, of an arc spanning from one end of a boundary line to the projected point of the other end of the same boundary line. The skew angle ⊖ is in the range of (⊖r, 2⊖r), wherein the angle ⊖ is an electrical angle and ⊖r, in degrees, is defined as, ⊖r=180×(number of magnetic poles of the rotor)/(smallest integer of which both the number of magnetic poles of the rotor and number of magnetic poles of the stator are factors).

Thus, in this embodiment, ⊖r equals 60 electrical degrees and the skew angle ⊖ is between 60 and 120 electrical degrees. As the rotor in this embodiment has four poles, this relates to a mechanical angle of 30 to 60 degrees.

Referring to FIGS. 4 to 7, the rotor core 34 defines a plurality of locating grooves 35 which may be used to locate the rotor core 34 in the process of producing the rotor core 34. The grooves 35 extend axially from one end of the rotor core 34 to the other end and are parallel to the rotational axis of the rotor and have axially extended openings 43 covered by the ring magnet 36. In this embodiment, the number of grooves 35 is equal to the number of magnetic poles 37. Two end planes respectively extend through opposite ends of the magnet 36 and opposite ends of the rotor core 34. At one end plane, start charging point (an end of a boundary line 39 between two adjacent magnetic poles 37) of each magnetic pole 37 is offset from the end of a corresponding locating groove 35 so that the whole boundary line 39 between magnetic poles 37 is away from the groove 35 and no part of the boundary line overlaps with the groove 35 in the radial direction of the rotor. This is more clearly shown in FIG. 4 where a section of the ring magnet 36, corresponding to one of the magnet poles 37 has been cutaway or removed to show that each groove 35 is located completely under the corresponding magnetic pole 37 and does not cross the boundary line 39 between adjacent magnetic poles of the ring magnet 36. FIG. 3 also shows the locating grooves 35 of the rotor core 34. In a radial plane (represented by the line 41 in FIG. 3) midway between the axial ends of the rotor core, each groove 35 and a centerline 40 of the corresponding magnetic pole 37 radially overlap.

Preferably, the angle β formed at the end plane between a line extending through the middle of a groove 35 and the center of the rotor and another line extending through the closest start charging point of a corresponding magnetic pole 37 and the center of the rotor is in the range of 10~30 degrees, the angle β being a mechanical angle. Alternatively, the groove and the magnet are arranged such that at the radial plane located midway between the ends of the rotor core, the grooves and the center of the magnetic poles are radially aligned. This provides greater symmetry to the magnetic field of the rotor which is preferred for a motor designed to operate in two directions, i.e. clockwise and counter clockwise directions.

Figure 8:
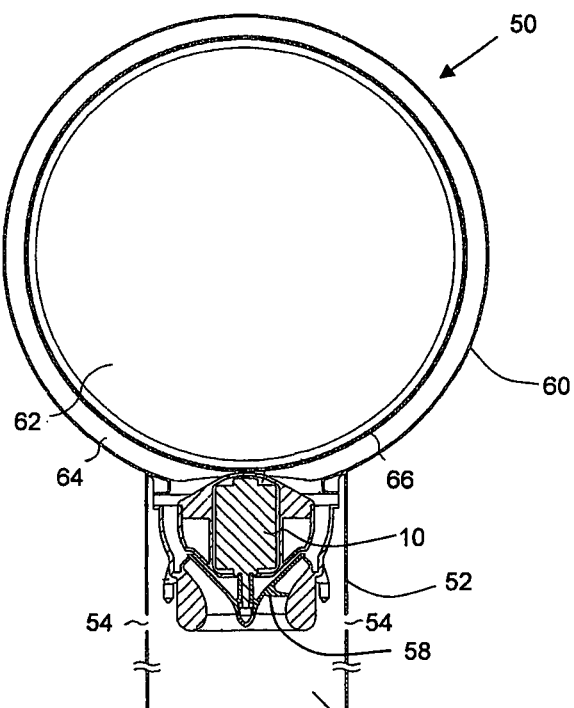
FIG. 8 illustrates a bladeless fan using the brushless motor of FIG. 1.
Figure 9:
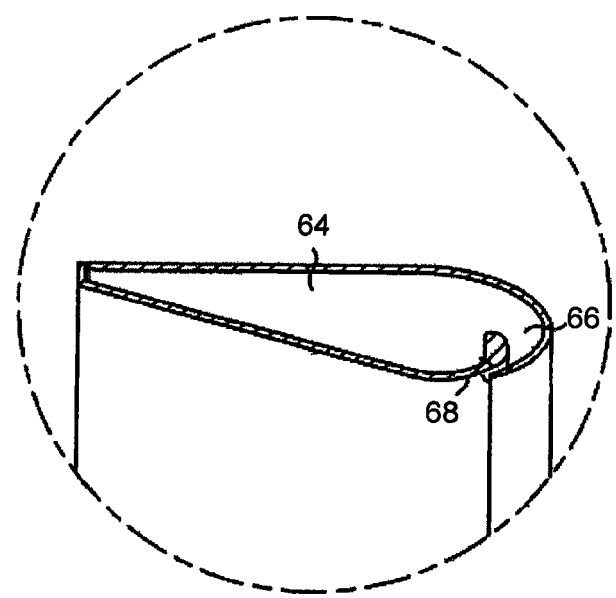
FIG. 9 is an enlarged view showing a part of an outlet of a nozzle of the fan of FIG. 8.

FIGS. 8 and 9 show a bladeless fan 50 using the above brushless motor. The fan 50 comprises a base 52 and a ring nozzle 60 mounted on the base 52. The base 52 has an inner chamber 56 with inlets 54. The nozzle 60 comprises a central opening 62, an inner passage 64 communicating with the chamber 56 of the base 52. The nozzle 60 further comprises an outlet 66 which communicates with the inner passage 64. A Coanda surface 68 is formed at the end of the outlet 66. A Coanda surface is a known type of surface over which a fluid exiting an output orifice close to the surface exhibits the coanda effect. A description of the coanda effect can be found in US20090060711 the content of which is incorporated herein by reference.

The motor 10 is disposed within the chamber 56 of the base 52. An impeller 58 is attached to the shaft of the motor 10. In operation, the impeller creates an airflow flowing from outside of the base 52 into the chamber 56 of the base 52 via the inlets 54, then through the inner passage 64 of the nozzle 60 and finally out of the nozzle 60 via the outlet 66.

In the present invention, the magnetic poles are skewed poles which can reduce the harmonic content of cogging torque to thereby reduce the total cogging torque of the motor. The whole boundary line 39 between magnetic poles 37 is located away from the locating groove 35 of the rotor core 34 to avoid the magnetically weakest part of the magnet facing a large air gap formed by the groove 35, which can reduce cogging torque too.

In the description and claims of the present application, each of the verbs "comprise", "include", "contain" and "have", and variations thereof, are used in an inclusive sense, to specify the presence of the stated item but not to exclude the presence of additional items.

Although the invention has been described with reference to one or more preferred embodiments, it should be appreciated by those skilled in the art that various modifications are possible. Therefore, the scope of the invention is to be determined by reference to the claims that follow.

For example, the ring magnet 36 is shown and described as a single piece permanent magnet formed as a ring and charged to produce a number of circumferentially spaced magnetic poles which are skewed to the rotor axis. However, the ring magnet could be formed from a number of permanent magnet pieces mounted to the rotor core to form the ring magnet and then charged to produce the skewed magnetic poles. Preferably, in such an arrangement, the boundary lines 39 coincide with the circumferential sides or edges of the magnet pieces.

The invention claimed is:
1. A brushless motor comprising:
  a stator comprising a stator core with teeth protruding inwardly and windings wound on the teeth, and
  a rotor comprising a shaft, a rotor core fixed to the shaft, and a ring magnet fixed to the circumferential outer surface of the rotor core, the magnet comprising a plurality of magnetic poles radially magnetized so that north poles and south poles are arranged alternately in the circumferential direction,
  wherein boundary lines between magnetic poles are skewed by an angle α relative to an axis (Z) of the shaft, and a plurality of grooves formed in the circumferential outer surface of the rotor core, each groove extending axially from one end of the rotor core to the other end of the rotor core;

wherein the boundary lines between adjacent magnetic poles do not radially overlap the grooves.

2. The brushless motor of claim 1, wherein the angle α is in the range of 15 ~30 degrees.

3. The brushless motor of claim 1, wherein a skew angle Θ of the boundary lines between magnetic poles measured at an end plane extending through one end of the magnet, is in the range of Θr to 2Θr, wherein Θr, in electrical degrees, is defined as, Θr=180×(number of magnetic poles in the rotor)/(smallest integer of which both the number of magnetic poles in the rotor and number of magnetic poles in the stator are factors).

4. The brushless motor of claim 1, wherein the number of magnetic poles is 4 and the number of teeth is 6.

5. The brushless motor of claim 1, wherein the number of the grooves is equal to the number of magnetic poles of the rotor, and wherein in a radial plane midway between the axial ends of the rotor core, each groove and a centerline of the corresponding magnetic pole radially overlap.

6. A bladeless fan comprising the brushless motor of claim 1.

7. The bladeless fan of claim 6, wherein the fan comprises a base with an inner chamber and a ring nozzle mounted on the base, the nozzle comprises an inner passage communicating with the chamber of the base, the motor being disposed within the chamber, an impeller being mounted to the shaft of the motor and arranged to move air from outside of the base into the chamber and through the inner passage of the nozzle.

8. The bladeless fan of claim 7, wherein the nozzle further comprises a ring outlet communicating with the inner passage, and a Coanda surface formed at the outlet of the nozzle.

9. The brushless motor of claim 1, wherein entire radial inner surfaces of the teeth of the stator core are arranged on an imaginary circle concentric with the shaft.

10. The brushless motor of claim 1, wherein a bottom surface of each groove is a concave surface.

11. A brushless motor comprising:
a stator comprising a stator core with teeth protruding inwardly and windings wound on the teeth, and
a rotor comprising a shaft, a rotor core fixed to the shaft, and a ring magnet fixed to the circumferential outer surface of the rotor core, the magnet comprising a plurality of magnetic poles radially magnetized so that north poles and south poles are arranged alternately in the circumferential direction,
wherein boundary lines between magnetic poles are skewed by an angle α relative to an axis (Z) of the shaft, and a plurality of grooves formed in the circumferential outer surface of the rotor core, each groove extending axially from one end of the rotor core to the other end of the rotor core;
wherein the number of the grooves is equal to the number of magnetic poles of the rotor, and a start charging point of each magnetic pole is offset from a corresponding end of a corresponding groove.

12. The brushless motor of claim 11, wherein at an end plane extending through an end of the rotor core and a corresponding end of the magnet, an angle β formed between a line extending through the center of the rotor and the start charging point of each magnetic pole and another line extending through the middle of the corresponding groove and the center of the rotor is in the range of 10~30 mechanical degrees.

13. A bladeless fan comprising the brushless motor of claim 11.

14. The bladeless fan of claim 13, wherein the fan comprises a base with an inner chamber and a ring nozzle mounted on the base, the nozzle comprises an inner passage communicating with the chamber of the base, the motor being disposed within the chamber, an impeller being mounted to the shaft of the motor and arranged to move air from outside of the base into the chamber and through the inner passage of the nozzle.

15. The bladeless fan of claim 14, wherein the nozzle further comprises a ring outlet communicating with the inner passage, and a Coanda surface formed at the outlet of the nozzle.

* * * * *